United States Patent
Sissoev et al.

(10) Patent No.: US 10,693,529 B1
(45) Date of Patent: Jun. 23, 2020

(54) METHOD AND APPARATUS FOR MULTIPLEXING SEVERAL ANTENNA SUBSYSTEM SIGNALS ONTO A SINGLE RF COAXIAL CABLE

(71) Applicant: AEROANTENNA TECHNOLOGY, INC., Chatsworth, CA (US)

(72) Inventors: Alex Sissoev, Chatsworth, CA (US); Joseph Klein, Chatsworth, CA (US)

(73) Assignee: AeroAntenna Technology, Inc., Chatsworth, CA (US)

( * ) Notice: Subject to any disclaimer, the term of this patent is extended or adjusted under 35 U.S.C. 154(b) by 0 days.

(21) Appl. No.: 16/588,107

(22) Filed: Sep. 30, 2019

(51) Int. Cl.
*H04B 7/04* (2017.01)
*H04W 72/04* (2009.01)
*H04N 21/2385* (2011.01)
*H01Q 1/38* (2006.01)

(52) U.S. Cl.
CPC ............. *H04B 7/04* (2013.01); *H01Q 1/38* (2013.01); *H04N 21/2385* (2013.01); *H04W 72/0453* (2013.01)

(58) Field of Classification Search
CPC ........ H04B 7/04; H01Q 1/38; H04N 21/2385; H04W 72/0453
See application file for complete search history.

(56) References Cited

U.S. PATENT DOCUMENTS

| | | | | |
|---|---|---|---|---|
| 3,611,198 A * | 10/1971 | Ma | ................. | H03H 7/466 333/132 |
| 5,502,715 A * | 3/1996 | Penny | ................ | H04B 3/36 370/293 |
| 5,673,052 A * | 9/1997 | Cosenza | ................ | H01Q 1/38 343/700 MS |
| 5,859,842 A * | 1/1999 | Scott | .................. | H04B 7/0837 370/342 |
| 5,861,843 A * | 1/1999 | Sorace | ................. | H01Q 3/267 342/174 |
| 6,064,338 A * | 5/2000 | Kobayakawa | ............ | G01S 3/14 342/378 |
| 6,405,018 B1 * | 6/2002 | Reudink | ................ | H04B 7/04 455/20 |
| 6,473,447 B1 * | 10/2002 | Strich | .................. | H04W 16/06 342/361 |
| 6,584,302 B1 * | 6/2003 | Hottinen | ............. | H04B 7/0617 370/275 |
| 6,892,056 B1 * | 5/2005 | Garmonov | .......... | H04B 1/3877 455/550.1 |
| 7,002,902 B2 * | 2/2006 | Proctor, Jr. | ............ | H01Q 1/246 370/209 |

(Continued)

*Primary Examiner* — James M Perez

(74) *Attorney, Agent, or Firm* — Burr & Forman LLP

(57) ABSTRACT

A single cable interface for operably coupling a radio to an antenna may include a radio interface operably coupled to the radio, an antenna interface operably coupled to the antenna, and a single RF coaxial cable extending between the radio interface and the antenna interface. The radio interface and the antenna interface may each be configured to multiplex and de-multiplex multiple RF signals communicated from the radio to the antenna or from the antenna to the radio such that each of the multiple RF signals is communicated over the single RF coaxial cable. The multiple RF signals include a first RF signal and a second RF signal, the first and second RF signals having a same carrier frequency, phase and modulation type.

10 Claims, 5 Drawing Sheets

(56) References Cited

U.S. PATENT DOCUMENTS

| | | | | |
|---|---|---|---|---|
| 7,782,827 B2* | 8/2010 | Deane | | H04B 1/40 370/339 |
| 7,787,520 B2* | 8/2010 | Kent | | H04L 25/0204 342/174 |
| 8,098,776 B2* | 1/2012 | Kent | | H04B 7/0697 375/141 |
| 8,111,789 B2* | 2/2012 | Kent | | H04L 25/0204 342/377 |
| 8,621,530 B1* | 12/2013 | Guzman | | H04N 7/20 370/343 |
| 9,602,184 B2* | 3/2017 | Honda | | H01Q 3/26 |
| 10,181,645 B1* | 1/2019 | Klein | | H01Q 5/55 |
| 10,263,817 B1* | 4/2019 | Roe | | H04L 27/04 |
| 10,297,917 B2* | 5/2019 | Klein | | H01Q 5/55 |
| 10,361,781 B1* | 7/2019 | Frozenfar | | H04J 14/02 |
| 10,396,455 B2* | 8/2019 | Klein | | H01Q 1/28 |
| 10,461,421 B1* | 10/2019 | Tran | | H01Q 3/46 |
| 2001/0047424 A1* | 11/2001 | Alastalo | | H04B 7/0842 709/236 |
| 2002/0009062 A1* | 1/2002 | Proctor, Jr. | | H01Q 3/26 370/335 |
| 2002/0181561 A1* | 12/2002 | Sano | | H04B 1/712 375/148 |
| 2003/0028897 A1* | 2/2003 | Brooks | | H04N 7/17309 725/129 |
| 2003/0096588 A1* | 5/2003 | Vanderhelm | | H04B 1/28 455/295 |
| 2003/0201939 A1* | 10/2003 | Reece | | H01Q 21/24 343/700 MS |
| 2005/0184906 A1* | 8/2005 | Nakaya | | H01Q 3/2605 342/377 |
| 2017/0302471 A1* | 10/2017 | Koenigsmark | | H04L 69/08 |
| 2018/0083673 A1* | 3/2018 | Berlin | | H04W 88/085 |
| 2018/0351601 A1* | 12/2018 | Spagnolini | | H04B 7/24 |
| 2019/0149248 A1* | 5/2019 | Stang | | H04B 17/12 375/267 |
| 2020/0091608 A1* | 3/2020 | Alpman | | H01Q 5/47 |

* cited by examiner

METHOD AND APPARATUS FOR MULTIPLEXING SEVERAL ANTENNA SUBSYSTEM SIGNALS ONTO A SINGLE RF COAXIAL CABLE

TECHNICAL FIELD

Example embodiments generally relate to the antenna subsystem interfaces and, more particularly, relate to the physical transfer of radio frequency (RF) and antenna mode synchronization and control signals between the radio and the antenna.

BACKGROUND

Modern antenna subsystems often incorporate complex electronics to aid in signal control and conditioning (gain and power), antenna pointing vector (beam) forming and steering, and built-in test and diagnostics equipment (BITE) functions (for example, reading antenna temperature, etc.). Most of the time, these functions are performed with, or controlled by, the radio. Moreover, in many situations, multiple RF signals (for transmission or reception) are routed to a single antenna subsystem. All of this can be accomplished by using multiple interface cables.

FIG. 1 illustrates an example of such a system. In this regard, radio 100 is operably coupled to the antenna 110 (or antenna subsystem) via a multi-cable interface 120. The multi-cable interface 120 includes a plurality of individual coaxial cables that are each associated with a corresponding function for the antenna 110 and/or the radio 100. Although this system looks simple enough in the block diagram form of FIG. 1, in reality it can be both complicated and costly to provide all the necessary cables for the multi-cable interface 120, to route and connect each one, and to thereafter provide maintenance for the system. Moreover, the overall weight of the system (due to the weight of the cables) can become significant as more and more cables are added for additional functions and interconnections. The weight issue may not matter in certain contexts. However, particularly in aerospace applications, weight is definitely an important consideration.

Accordingly, it may be desirable to reduce the installation complexity, system component count, maintenance effort, and overall system weight.

BRIEF SUMMARY OF SOME EXAMPLES

Some example embodiments may provide a method and apparatus for multiplexing several antenna subsystem signals onto a single RF coaxial cable. The ability to multiplex these signals may allow a single coaxial cable to replace many such cables, and may reduce installation complexity, part count, cost, maintenance effort, and overall system weight.

In an example embodiment, a single cable interface for operably coupling a radio to an antenna may be provided. The single cable interface may include a radio interface operably coupled to the radio, an antenna interface operably coupled to the antenna, and a single RF coaxial cable extending between the radio interface and the antenna interface. The radio interface and the antenna interface may each be configured to multiplex and de-multiplex multiple RF signals communicated from the radio to the antenna or from the antenna to the radio such that each of the multiple RF signals is communicated over the single RF coaxial cable. The multiple RF signals include a first RF signal and a second RF signal, the first and second RF signals having a same carrier frequency, phase and modulation type.

In another example embodiment, an antenna subsystem may be provided. The antenna subsystem may include a radio, an antenna and a single cable interface. The single cable interface may include a radio interface operably coupled to the radio, an antenna interface operably coupled to the antenna, and a single RF coaxial cable extending between the radio interface and the antenna interface. The radio interface and the antenna interface may each be configured to multiplex and de-multiplex multiple RF signals communicated from the radio to the antenna or from the antenna to the radio such that each of the multiple RF signals is communicated over the single RF coaxial cable. The multiple RF signals include a first RF signal and a second RF signal, the first and second RF signals having a same carrier frequency, phase and modulation type.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
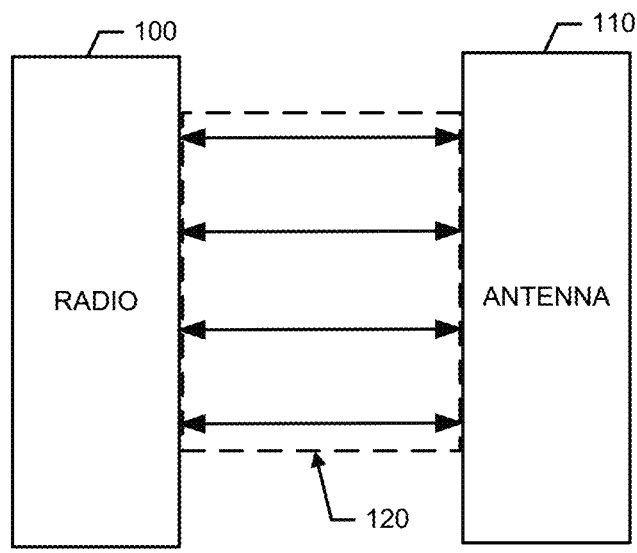
FIG. 1 illustrates a conventional multi-cable interface for connecting an antenna subsystem to a radio.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 2:
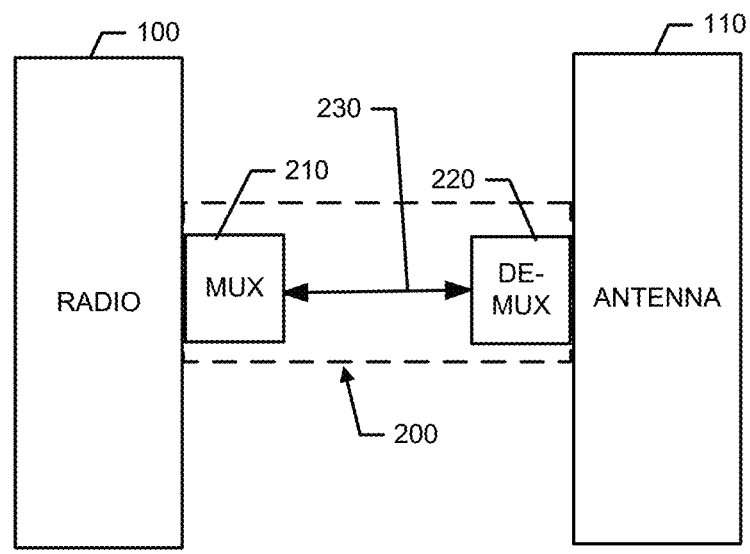
FIG. 2 illustrates block diagram of a single cable interface of an example embodiment.

As discussed above, the example of FIG. 1, uses many cables to control the various functions of the antenna subsystem. Meanwhile, example embodiments of the present invention provide a way to multiplex several antenna subsystem signals onto a single RF coaxial cable. These signals can be of different types, such as RF modulated carrier signals for transmission or reception by the antenna subsystem, digital data signals for antenna subsystem control and functions, and discrete analog signals, such as a synchronization pulse. FIG. 2 illustrates a block diagram of an example embodiment.

Referring now to FIG. 2, the radio 100 and the antenna 110 may essentially be the same components described above. However, the multi-cable interface 120 of FIG. 1 is completely replaced by a single cable interface 200. The single cable interface 200 may include a signal multiplexer 210 and a signal de-multiplexer 220 on each opposing end of a single RF coaxial cable 230. FIG. 2 shows the signal multiplexer 210 on the radio side of the single cable interface 200, and the signal de-multiplexer 220 on the antenna side of the single cable interface 200. However, it should be appreciated that multiplexing and de-multiplexing functions may be swapped for receiving (as opposed to transmitting) signals as well. Thus, these components can be functionally swapped dependent on the direction of data flow. Moreover, in some embodiments, the devices that form respective instances of multiplexers and de-multiplexers may be provided at each respective end of the single cable interface 200, and may be capable of performing both functions dependent on the direction of data flow to permit full two-way operation of example embodiments.

Example embodiments may provide (via the single cable interface 200) the ability to combine several identical RF modulated carrier signals, which can have the same frequency, level, modulation type, baseband characteristics, and even identical information payload, into a single cable medium. This may be accomplished by converting the signal(s) with the same carrier frequency to a different frequency using the frequency mixer principle shown in Equation (1) below:

$$f = f_C \pm f_{LO} \quad (1)$$

In Equation (1), f is the frequency resulting after mixing the original carrier frequency, $f_C$, with the local oscillator frequency, $f_{LO}$. It is important to note that the method utilizes a single local oscillator for this purpose. The local oscillator may, for example, be located in the radio 100 in the example shown. This eliminates the risk of the converted frequencies being misaligned and avoids the need for additional timing synchronization between the radio 100 and the antenna 110 (or antenna subsystem).

Another feature of example embodiments is the use of a radio transceiver to convert the digital data, which may be coming in on any standard digital bus, into a high frequency modulated radio signal (for example, amplitude shift keying (ASK), frequency shift keying (FSK), phase shift keying (PSK), frequency modulation (FM), etc.) and sending the digital data over the single cable interface 200 (e.g., via the signal multiplexer 210). The single cable interface 200 also provides the ability to then receive the signal coming from the other side and convert the signal back into properly formatted digital data (e.g., via the signal de-multiplexer 220).

Figure 3:
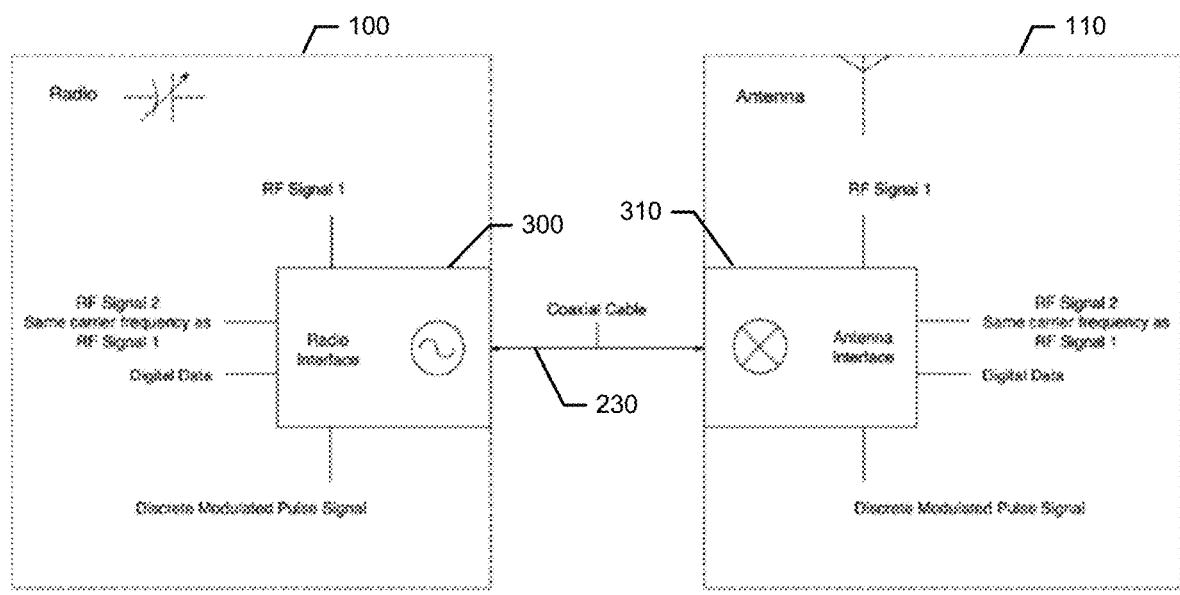
FIG. 3 illustrates a system block diagram of the single cable interface of FIG. 2 in one example context.

A discrete analog pulse may also be used to switch (e.g., using on/off keying (OOK) modulation) another local oscillator (LO) to send an OOK modulated carrier over the single cable interface 200. The discrete analog pulse may be used for various purposes including, for example, synchronizing the radio and antenna subsystem execution timings. FIG. 3 illustrates a system block diagram showing the example of FIG. 2 within a particular context in which a first RF signal (RF Signal 1) and a second RF signal (RF Signal 2) are applied to an example embodiment of the signal multiplexer 200 (i.e., radio interface 300). The radio interface 300 also includes a Digital Data signal and a Discrete Modulated Pulse Signal applied thereto. The first and second RF signals in this example each have the same carrier frequency.

As can be seen from FIG. 3, the radio interface 300 multiplexes all of the signals (i.e., the first and second RF signals, the Digital Data signal and a Discrete Modulated Pulse Signal) onto the single RF coaxial cable 230 for receipt at an example embodiment of the signal de-multiplexor 210 (i.e., the antenna interface 310). The antenna interface 310 is then configured to extract each of the respective multiplexed signals. Thus, the antenna interface 310 is shown producing the first and second RF signals, the Digital Data signal and a Discrete Modulated Pulse Signal all for use at the antenna 110.

Figure 4:
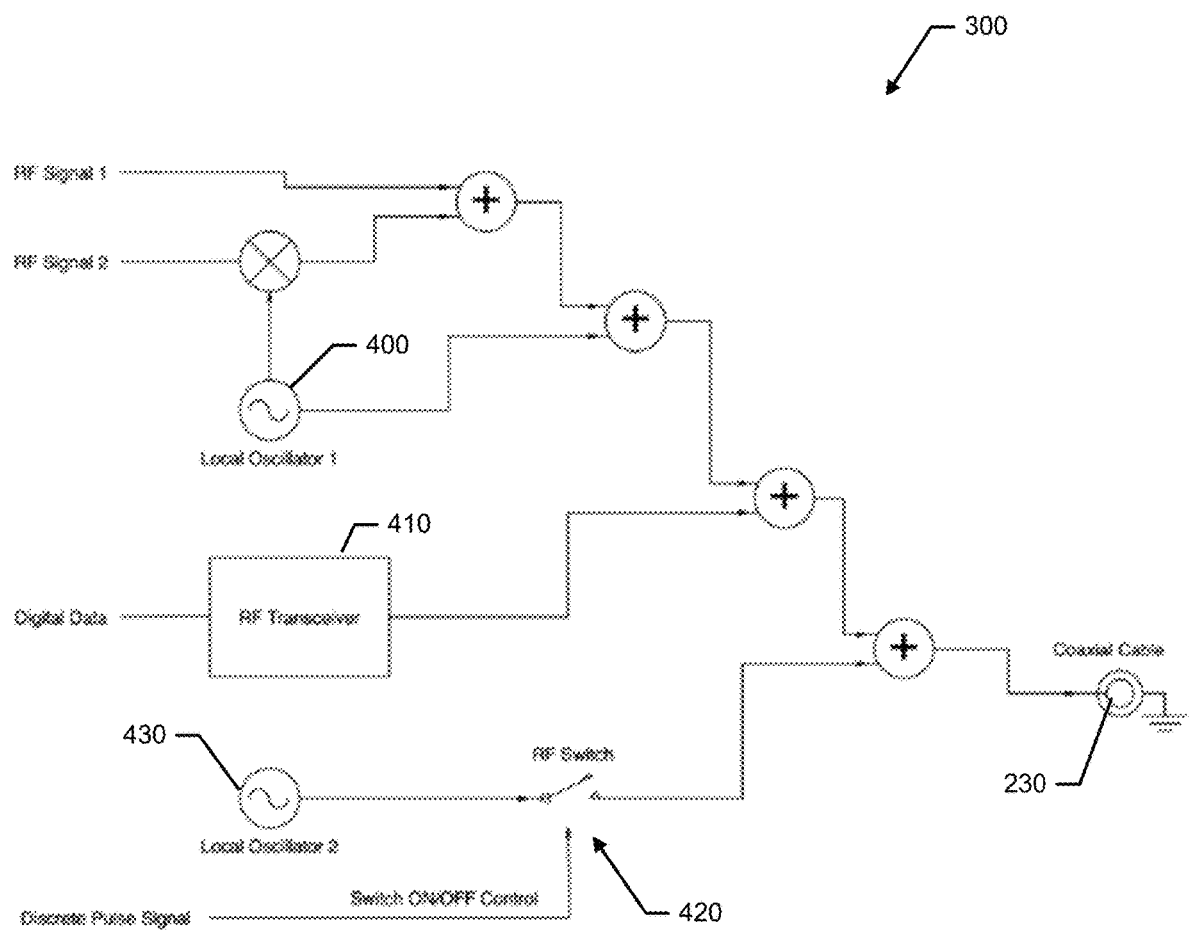
FIG. 4 illustrates a block diagram of a single cable interface multiplexer in accordance with an example embodiment.
Figure 5:
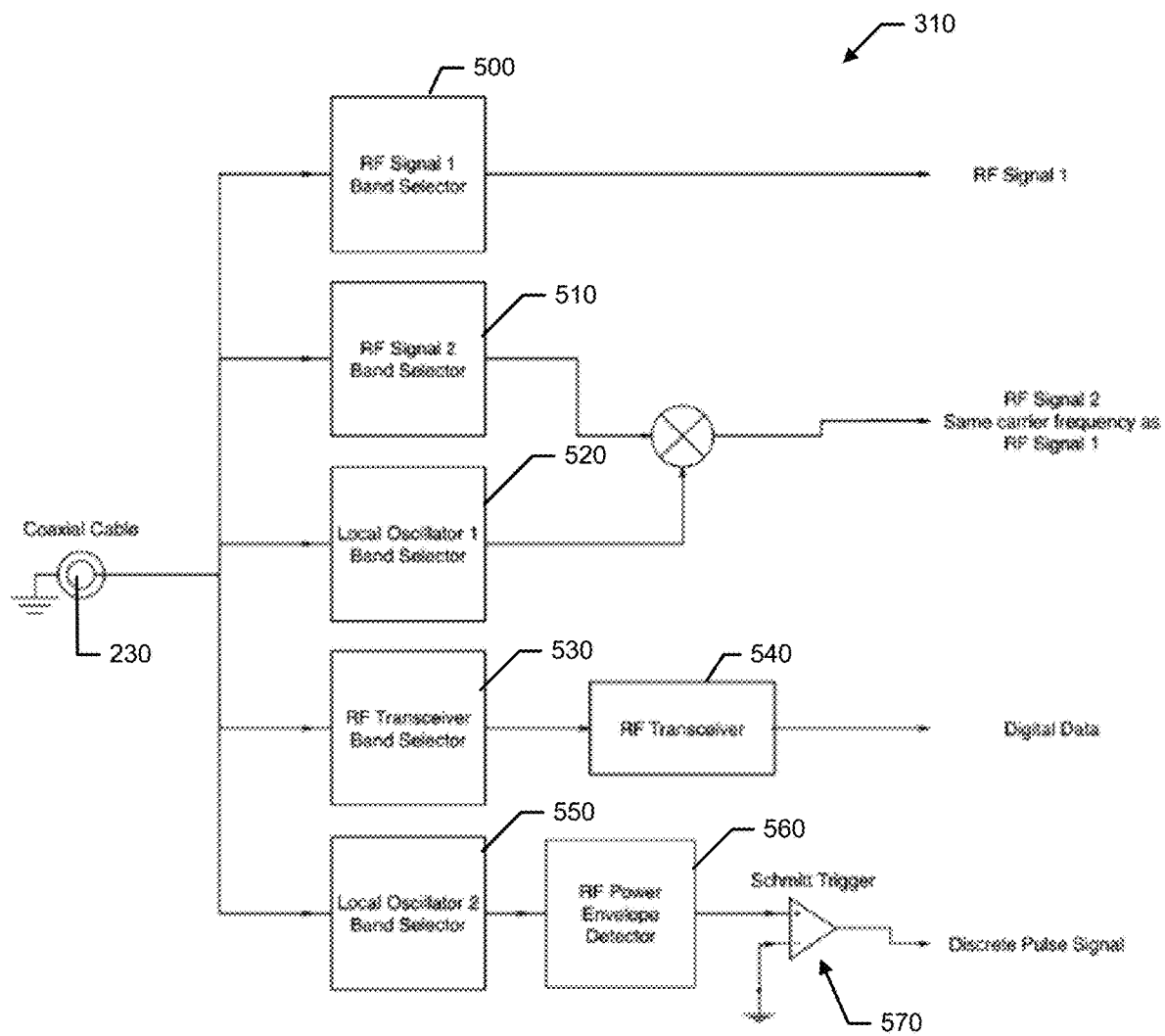
FIG. 5 illustrates a block diagram of single cable de-multiplexer in accordance with an example embodiment.

FIGS. 4 and 5 will now be referenced to describe an example embodiment of the signal multiplexer 210 and radio interface 300 (FIG. 3) and the signal de-multiplexer 220 and antenna interface 310 (FIG. 4) that may be used in the system of FIGS. 2 and 3, respectively. Referring now to FIGS. 4 and 5, the first RF signal (i.e., RF Signal 1) is ideally passed onto (or received unaltered from) the single RF coaxial cable 230 via the radio interface 300. Meanwhile, at the antenna side (shown for this example in FIG. 5), RF Signal 1 is extracted via the first band selector 500. The first band selector 500 is configured to perform the following function shown in Equation (2):

$$A(f, t) = \begin{cases} A(f, t), & \text{for } f > f_{MIN} \\ A(f, t), & \text{for } f < f_{MAX} \\ 0, & \text{otherwise} \end{cases} \quad (2)$$

In Equation (2), A(f,t) is the amplitude of the signal, which is a function of the frequency of the signal and the time. The value $f_{MIN}$ is the minimum frequency of the signal band, and $f_{MAX}$ is the maximum frequency of the signal band (which is RF Signal 1, in this case). By applying equation (2), the first band selector 500 removes the other signals multiplexed onto the single RF coaxial cable 230, and passes only RF Signal 1.

RF Signal 2, originally having the same carrier frequency as RF Signal 1, gets up or down frequency-converted according to Equation (1) using a local oscillator 400, which produces a Local Oscillator 1 signal. By doing this, any interference with the RF Signal 1 can be avoided and the frequency converted RF Signal 2 can be multiplexed onto the single RF coaxial cable 230 as shown in FIG. 4. At the same time, the Local Oscillator 1 signal is passed unaltered onto the single RF coaxial cable 230. As illustrated in FIG. 5, both the RF Signal 2 and the Local Oscillator 1 signal are passed through respective band selectors (i.e., second band selector 510 and third band selector 520, respectively). The second and third band selectors 510 and 520 are also configured to employ the processing described by Equation (2) for their respective frequency bands. Then, as shown in FIG. 5, the output (modified) RF Signal 2 from the second band selector 510 is mixed with Local Oscillator 1 signal output from the third band selector 520 according to Equation (1) and the resulting signal is the RF Signal 2 with its original carrier frequency (equal to that of RF Signal 1.

As shown in FIG. 4, formatted Digital Data may be fed into (or out of) RF transceiver 410. The RF transceiver 410 may be configured to modulate (or demodulate) the Digital Data onto (or from) a discrete carrier frequency using any modulation type (e.g., ASK, FSK, PSK, FM, etc.). In this way, the Digital Data can be transferred by an RF carrier in the single RF coaxial cable 230. As illustrated in FIG. 5, this signal may be passed through a fourth band selector 530 (e.g., an RF Transceiver Band Selector) and transformed according to Equation (2). The result may then be fed into (or out from) RF Transceiver 540. RF Transceiver 540 may be configured to convert the resultant output from the fourth band selector 530 to (or from) formatted Digital Data.

The Discrete Pulse Signal (which may be an analog signal) is also shown in FIG. 4, and may be used as an ON/OFF control for an RF Switch 420. A second local oscillator 430 may be used to generate a Local Oscillator 2 signal, which may be turned on or off using the RF Switch 420 and multiplexed onto the single RF coaxial cable 230 according to the functional table 1 shown below:

TABLE 1

| Discrete Analog Pulse State | RF Switch State | Local Oscillator 2 State |
|---|---|---|
| Pulse High | ON | Multiplexed |
| Pulse Low | OFF | Not Multiplexed |

At the antenna subsystem side (i.e., FIG. 5), the Local Oscillator 2 signal may be fed a fifth band selector 550, which may be configured to extract the Local Oscillator 2 signal. The fifth band selector 550 may be configured to perform the transformation according to Equation (2). An output of the fifth band selector 550 may be fed into an RF power envelope detector 560. The RF power envelope detector 560 may be configured to perform the following function in Equation (3):

$$V_{OUT} = V(P_{RFIN}) \quad (3)$$

In Equation (3), the RF Power Envelope Detector output voltage, $V_{OUT}$, is a function of the RF power level of the signal coming into the RF power envelope detector 560, $P_{RFIN}$. $V_{OUT}$ of the RF power envelope detector 560 may be connected to the input, $V_{IN}$, of a Schmitt Trigger circuit 570. The Schmitt Trigger circuit 570 may be configured to function according to Equation (4):

$$V_{ST}(V_{IN}) = \begin{cases} V_{MAX}, & \text{for } V_{IN} > V_{TH} \\ 0, & \text{for } V_{IN} < V_{TH} \end{cases} \quad (4)$$

In Equation (4), $V_{ST}$ is the output voltage of the Schmitt Trigger circuit 560, $V_{MAX}$ is the maximum output voltage of the Schmitt Trigger circuit 560, and $V_{TH}$ is a preset threshold level that may be set at any (sensitivity) level between 0 and $V_{MAX}$. In this manner, if the Local Oscillator 2 signal level exceeds the preset threshold level, a voltage high level is produced. Otherwise, the voltage is at the low level (0). This can now be easily digitized for any form of digital signaling.

As can be appreciated from FIGS. 4 and 5, any number of RF signals could be included in example embodiments, so long as a corresponding number of additional local oscillators and band selectors are also added. Moreover, other signals could also be added over the single RF coaxial cable 230 by being treated in similar manners to those described above. Thus, the concepts associated with example embodiments are fully scalable. Additionally, as noted above, the architecture works in both directions (receive and transmit) and the respective interfaces (i.e., the radio interface 300 and antenna interface 310) flip their roles between multiplexing or de-multiplexing depending on the direction of flow through the system.

In a general sense, example embodiments may therefore provide an architecture for multiplexing RF signals with the same carrier frequency, phase, and modulation type onto a single RF coaxial cable using frequency mixing with a single local oscillator (Local Oscillator 1) and band selectors corresponding to the number of signals being multiplexed. Example embodiments may also provide a method of transmitting digital data (i.e., the Digital Data of FIGS. 3-5) by multiplexing an RF modulated carrier onto a single coaxial cable using an RF transceiver. Example embodiments may also provide an architecture for multiplexing discrete analog pulses (e.g., the Discrete Pulse signal of FIG. 4) onto a single RF coaxial cable using a local oscillator (e.g., Local Oscillator 2) and an RF switch, along with an RF envelope detector, and a Schmitt Trigger.

Thus, an example embodiment may provide single cable interface for operably coupling a radio to an antenna. The single cable interface may include a radio interface operably coupled to the radio, an antenna interface operably coupled to the antenna, and a single RF coaxial cable extending between the radio interface and the antenna interface. The radio interface and the antenna interface may each be configured to multiplex and de-multiplex multiple RF signals communicated from the radio to the antenna or from the antenna to the radio such that each of the multiple RF signals is communicated over the single RF coaxial cable. The multiple RF signals include a first RF signal and a second RF signal, the first and second RF signals having a same carrier frequency, phase and modulation type.

The interface described above may include additional features, modifications, augmentations and/or the like to achieve further objectives or enhance operation of the system. The additional features, modifications, augmentations and/or the like may be added in any combination with each other. For example, the radio interface and the antenna interface may include a first local oscillator. The second RF signal may be modified by mixing with a frequency output of the first local oscillator to an intermediate carrier frequency (i.e., Local Oscillator 1 signal) for multiplexing onto the single RF coaxial cable by the radio interface. The antenna interface may also include a first band selector configured to select the first RF signal, a second band selector configured to select the second RF signal and a third band selector configured to select the intermediate carrier frequency (i.e., the Local Oscillator 1 signal). In an example embodiment, the radio interface may include a first RF transceiver configured to convert digital data into a representative RF signal for multiplexing onto the single RF coaxial cable along with the first and second RF signals. In some cases, the antenna interface may include a fourth band selector configured to select the representative RF signal, and a second RF transceiver configured to convert the representative RF signal into the digital data. In an example embodiment, the radio interface may include a second local oscillator configured to be modulated with a discrete pulse signal via an RF switch to generate a modulated RF signal. In some cases, the antenna interface may include a second local oscillator band selector, an RF power envelope detector and a Schmitt trigger configured to generate the discrete pulse signal based on the modulated RF signal after communication of the modulated RF signal over the single RF coaxial cable.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A single cable interface for operably coupling a radio to an antenna, the single cable interface comprising:
    a radio interface operably coupled to the radio;
    an antenna interface operably coupled to the antenna; and
    a single RF coaxial cable extending between the radio interface and the antenna interface,
    wherein the radio interface and the antenna interface are each configured to multiplex and demultiplex multiple RF signals communicated from the radio to the antenna or from the antenna to the radio such that each of the multiple RF signals is communicated over the single RF coaxial cable,
    wherein the multiple RF signals include a first RF signal and a second RF signal, the first and second RF signals having a same carrier frequency, phase and modulation type,
    wherein the radio interface and the antenna interface include a first local oscillator,
    wherein the second RF signal is modified by mixing with a frequency output of the first local oscillator to an intermediate carrier frequency for multiplexing onto the single RF coaxial cable by the radio interface, and
    wherein the antenna interface includes a first band selector configured to select the first RF signal, a second band selector configured to select the second RF signal and a third band selector configured to select the intermediate carrier frequency.

2. The single cable interface of claim 1, wherein the radio interface includes a first RF transceiver configured to convert digital data into a representative RF signal for multiplexing onto the single RF coaxial cable along with the first and second RF signals.

3. The single cable interface of claim 2, wherein the antenna interface includes a fourth band selector configured to select the representative RF signal, and a second RF transceiver configured to convert the representative RF signal into the digital data.

4. The single cable interface of claim 3, wherein the radio interface includes a second local oscillator configured to be modulated with a discrete pulse signal via an RF switch to generate a modulated RF signal.

5. The single cable interface of claim 4, wherein the antenna interface includes a second local oscillator band selector, an RF power envelope detector and a Schmitt trigger configured to generate the discrete pulse signal based on the modulated RF signal after communication of the modulated RF signal over the single RF coaxial cable.

6. An antenna subsystem comprising:
    an antenna;
    a radio; and
    a single cable interface for operably coupling the radio to the antenna, the single cable interface comprising:
    a radio interface operably coupled to the radio;
    an antenna interface operably coupled to the antenna; and
        a single RF coaxial cable extending between the radio interface and the antenna interface,
    wherein the radio interface and the antenna interface are each configured to multiplex and demultiplex multiple RF signals communicated from the radio to the antenna or from the antenna to the radio such that each of the multiple RF signals is communicated over the single RF coaxial cable,
    wherein the multiple RF signals include a first RF signal and a second RF signal, the first and second RF signals having a same carrier frequency, phase and modulation type,
    wherein the radio interface and the antenna interface include a first local oscillator, wherein the second RF signal is modified by mixing with a frequency output of the first local oscillator to an intermediate carrier frequency for multiplexing onto the single RF coaxial cable by the radio interface, and
    wherein the antenna interface includes a first band selector configured to select the first RF signal, a second band selector configured to select the second RF signal and a third band selector configured to select the intermediate carrier frequency.

7. The antenna subsystem of claim 6, wherein the radio interface includes a first RF transceiver configured to convert digital data into a representative RF signal for multiplexing onto the single RF coaxial cable along with the first and second RF signals.

8. The antenna subsystem of claim 7, wherein the antenna interface includes a fourth band selector configured to select the representative RF signal, and a second RF transceiver configured to convert the representative RF signal into the digital data.

9. The antenna subsystem of claim 8, wherein the radio interface includes a second local oscillator configured to be modulated with a discrete pulse signal via an RF switch to generate a modulated RF signal.

10. The antenna subsystem of claim 9, wherein the antenna interface includes a second local oscillator band selector, an RF power envelope detector and a Schmitt trigger configured to generate the discrete pulse signal based on the modulated RF signal after communication of the modulated RF signal over the single RF coaxial cable.

* * * * *